June 14, 1938. J. I. HARDY 2,120,358
DEVICE FOR MEASURING THE LENGTH OF FIBERS
Filed May 15, 1936
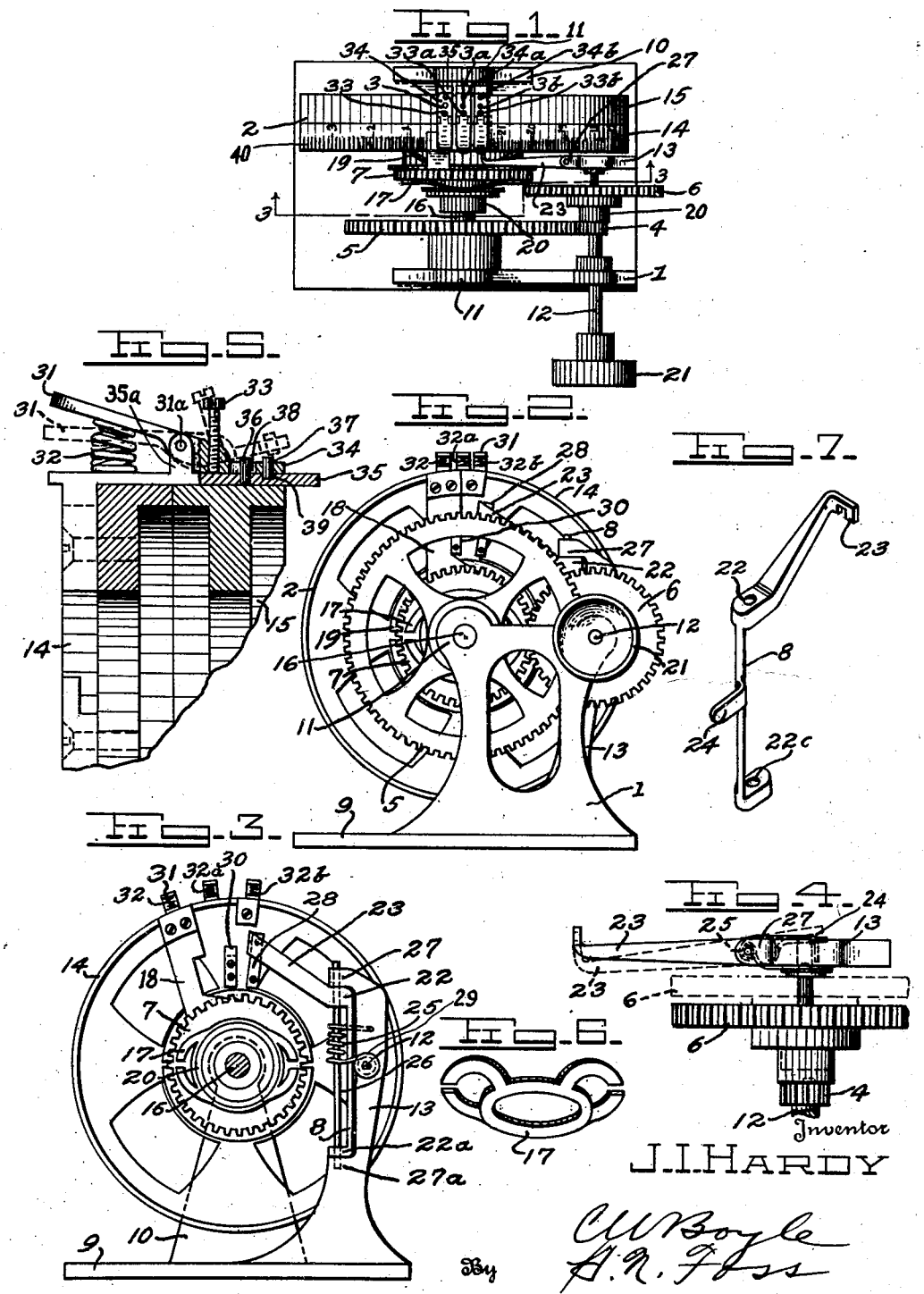

Patented June 14, 1938

2,120,358

UNITED STATES PATENT OFFICE 2,120,358

DEVICE FOR MEASURING THE LENGTH OF FIBERS

John I. Hardy, Washington, D. C.

Application May 15, 1936, Serial No. 79,942

3 Claims. (Cl. 33—125)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a device for rapidly measuring the length and crimp of fibers.

The length of wool fibers is ordinarily measured in a horizontal position, with a common ruler or scale. One end of a fiber is brought even with the end of a ruler and held there with a finger of one hand, while the fiber is extended along the edge of the ruler with the other hand until any crimp in the fiber is removed. This may be done on the surface of a piece of velvet or pile fabric, the roughness of which assists in holding the fiber in the extended position without undue stretching.

Length of fibers is sometimes measured in a vertical position by supporting one end with a clamp and attaching a light-weight clamp to the other end, which just removes the crimp of the fiber.

Length of short fibers may be measured on the stage of a binocular microscope by pulling them from under a microscope plate which is on accurately graded cross-section paper, laid even with the edge of one of the lines on the extreme side of the field of vision under the binocular. The protruding fibers are grasped at their extreme end and pulled slowly until they spring free from the plate, and their length is measured at the point to which they extend on the cross-section paper. This method has the advantage of permitting close observation of a fiber under a binocular microscope while being measured, but has the disadvantage of not applying to fibers of more than about one centimeter in length.

Crimp in wool is usually measured by placing the fibers on a ruler or scale and counting the number of curls or crimps per inch.

These methods for determining length and crimp of wool fibers are too slow and inaccurate.

My device conbines ease of operation, speed and accuracy. The device is so constructed that critical points on the fiber may be observed under a microscope while being measured. The application of this method is not limited to wool alone, being valuable in measuring the lengths of other animal as well as vegetable and artificial fibers.

One form of the procedure for measuring length consists of holding one end of a fiber in a fiber clamp and sliding another fiber clamp over the fiber until it just passes over the other end of the fiber. A third fiber clamp permits another procedure of measuring the fibers; this consists of holding a fiber tightly, approximately at its middle point and sliding clamps on either side of this clamp, which are respectively movable to the ends of the fiber, where the length of the fiber may be read directly on a graduated scale on the drum upon which the clamps revolve.

A measure of the crimp of a fiber is obtained by measuring the percentage of its length that a fiber contracts, due to its crimp.

These measurements are accomplished by the mechanical device illustrated in the accompanying drawing, in which Fig. 1 is a top plan view of the whole device; Fig. 2, a front elevation of the whole device; Fig. 3, a sectional view on line 3—3 of Fig. 1; Fig. 4, a fragmentary top plan view of push and pull hook assembly; Fig. 5, a fragmentary view of fiber clamp assembly; Fig. 6, perspective view of spring, and Fig. 7, a perspective view of push and pull hook removed.

Similar numerals refer to similar parts throughout the different views.

The device is mounted on a frame consisting of a base 9 with vertical parallel brackets 1 and 10. A horizontal shaft 16 is rotatably mounted between the said brackets in bearings 11, 11. A flanged wheel 15 is fixedly mounted on said shaft 16 next to the bracket 10 and a gear wheel 5 is fixed to said shaft 16 next to the bracket 1. Another flanged wheel 14, similar to the wheel 15, is rotatably mounted on the shaft 16, next to the said wheel 15. A floating gear wheel 7 is rotatably mounted on the shaft 16 between said wheel 14 and a collar thrust bearing 20, said collar thrust bearing being fixed to said shaft 16. A thrust spring 17 (see Figure 6) is axially mounted between the said collar 20 and the said gear wheel 7 and a similar thrust spring 19 is mounted on said shaft 16 between the wheel 14 and the gear wheel 7.

A countershaft 12 is rotatably and slidably mounted on the bracket 1 parallel to the shaft 16 extending to a through bearing 29 disposed in the bracket 13, which bracket is vertically mounted on the base 9 between said brackets 1 and 10. A pinion 4 and a gear wheel 6, held in spaced relation by means of a collar 20A, are fixedly mounted on said shaft 12 between said brackets 1 and 13 and in such a way that, when said shaft 12 is axially translated toward the bracket 13 the gear wheel 6 meshes with the gear wheel 7, while a translation in the opposite direction causes the pinion 4 to mesh with the gear wheel 5. The shaft 12 extends outward a short distance and has fixed to its extended end a knob 21 to facilitate the rotation and translation of said shaft.

A clamp 3a is fixedly mounted on the wheel 15 and extends over the wheel 14. Another clamp 3b, similar to the clamp 3a, is mounted on the wheel 14 and extends over the wheel 15. A third clamp 3 is slidably mounted on both of said wheels 14 and 15 and is held in position by means of a radial arm 18, which arm is fixedly secured to the gear wheel 7. A more detailed description of said clamps will be hereinafter given.

A push pull hook assembly comprises a vertical shaft 8 (Figures 3 and 7) with two horizontal offset bearings 22 and 22a pivotally mounted on the bracket 13 by means of a pin shaft 26 in bearings 27 and 27a of the said bracket 13. A bent lever 23 extends diagonally upward from bearing 22 up to a point approximately vertically over the shaft 16 and is then bent perpendicular to and toward the web planes of the said wheels 14 and 15 to form a notched lip 23. A short arm 24, horizontally fixed to the shaft 8 extends over to contact the through bearing 29 on the bracket 13 so that the notched lip 23 is pulled away from the wheel 14 when the shaft 12 is translated toward the said wheel 14, and its end passes through the bearing 29. When said shaft 12 is translated in the opposite direction, a spring 25 returns the notched lip 23 to its normal position. In this position the arm 24 is against the bearing 29. The said spring 25 may be of any convenient design. The drawing shows this spring as a spiral, tensionally mounted around the pin shaft 26 with one end extending over and attached to the bracket 13 on one side and the other end on the other side of the bracket 13 contacting the shaft 8.

Abutment shoulders 28 and 30 are secured radially to one of the webs of the wheel 14 with sufficient space between the two shoulders to permit the notched lip 23 to pass between them. Further said shoulders are so disposed axially that when the notched lip 23 is in one position, it abuts the shoulder 28 and clears 30 and when in the opposite position it abuts the shoulder 30 and clears shoulder 28. In addition to this feature, the notched lip 23 has an additional function in that when it is in the position in which it abuts the shoulder 28, it also abuts the side of the radial arm 18 but when said notched lip is in the position in which it clears the shoulder 28, it also clears the path of the said arm 18.

Referring to Figure 5 and with more particularity to the construction of the fiber clamps 3, 3a and 3b, all of which are exactly alike, a lever 31, preferably of a transparent material, such as glass, celluloid or any other suitable material, is pivotally mounted at 31a on vertical brackets 35a on a horizontal base 35. The said lever 31 comprises a jaw section on one side of the fulcrum 31a and a handle section on the other side. Between said handle section and base 35, a spring 32 is compressibly mounted, normally retaining the jaw section in pressure contact with the base 35. A set screw 33 is vertically mounted in the jaw section near the fulcrum 31a by means of which the pressure between the jaw section and the base 35 can be varied. In order to prevent any appreciable lateral movement of material which may be placed between the jaw section and the base 35 a pin 36, vertically fixed to the base 35 beneath the jaw of the clamp, extends upward, and is adapted to fall in registry with a recess 38 in said jaw member. At a convenient distance from this aperture 38 toward the outer end of the said jaw member another pin 37 is vertically secured through the said jaw member 34 extending downward and is adapted to fall in registry with a recess 39 in the said base 35. This last mentioned pin, however, extends only a short distance into the base 35 so that when the jaw member 34 is elevated, the pin 37 clears the base 35 sufficiently to permit the insertion of material between the jaw member 34 and the base 35 up to the pin 36.

The wheel 14 is graduated in any convenient scale 40 for measuring length. The inside edge of clamp 3b, the one fixed to the wheel 14, is taken as the zero point on the scale and the graduations extend from that point on the periphery of the wheel 4 away from the said clamps, substantially as shown.

The operation of this device is as follows: The three fiber clamps 3, 3a and 3b are brought together in their initial position as shown in Figure 1 either manually or by engaging the gear 6 with the gear 7 (this engagement is accomplished by translating the shaft 12 toward the wheel 14) and rotating knob 21 in a counter-clockwise direction. The position of the notched lip 23 should be between the shoulders 28 and 30. This is made possible because when shaft 12 is pushed in it engages on 24 and swings lip 23 out to clear projection 28. The knob 21 is then translated so the pinion 4 meshes with the gear 5. The device is now ready for operation. To measure the length of a fiber, such as wool, hair, cotton, silk, or other fibers, the jaws of the clamps 3, 3a and 3b are opened by pressing upon the handle sections of said fiber clamps simultaneously against the action of the springs 32. Then the fiber to be measured is placed between the jaw members of the clamps and their respective bases in a position between the pins 36 and 37 of each clamp. The handle sections of the jaws are then released and by means of the set screws 33 provided in each of the said clamps, the clamp 3a is adjusted so that it firmly holds the fiber sufficient to insure against any slippage, while the other two clamps are adjusted so that the fibers can just be drawn through them without danger of elongation or rupture. The fibers are now ready to be measured. With the pinion 4 meshing with the gear 5 the knob 21 is rotated clockwise. This rotation has the effect of rotating the gear 5 counter-clockwise as well as the shaft 16 to which it is keyed. Also the wheel 15 rotates counter-clockwise since it is also keyed to said shaft 16. Furthermore, since the clamp 3a is fixed to the wheel 15, it also is rotated counter-clockwise and carries with it by contact the fiber clamp 3. The fiber clamp 3b, however, remains stationary because it is fixed to the wheel 14 and said wheel 14 is prevented from rotating because the shoulder 28 abuts the notched lip 23 when the shaft 12 is in this position. The clockwise rotation of knob 21 is continued until one end of the fiber just slips through the clamp 3b. This is made possible in view of the fact that the clamp 3a holds the fiber from slipping because of the adjustment made with the set screw as above described and the fiber clamp 3b is adjusted so that the fiber can slip through the jaws thereof. The knob 21 is then rotated in a counter-clockwise direction. By this rotation the shaft 16 together with all parts mounted thereon whether fixed to the shaft or rotatably mounted thereon are rotated clockwise until the radial arm 18 abuts the notched lip 23. The reason all of the parts not fixed to the shaft rotate with the parts that are fixed to the shaft is because of frictional engagement. That is to say, the gear 7 and the wheel 14 being rotatably mounted on the shaft are held in frictional contact to the collar 20 and the wheel 15, respectively, by means of the springs 17 and 19, respectively. However, when the radial arm 18 abuts the notched lip 23, the friction between the gear 7 and the collar 20, to which gear the radial arm 18 is attached, is overcome and accordingly said gear 7 with its radial arm and the clamp 3 attached thereto remain stationary while the wheel 15 continues to rotate in a clockwise direction carrying with it the wheel 14 frictionally engaged with it. This rotation is continued until the other end of the fiber just slips through said clamp 3. The total angular rotation in both directions was just sufficient to describe an arc equal to the length of the fiber on the circumference of the wheel 14. The scale 40 being graduated from the clamp 3b fixed to the wheel 14 the position of the clamp 3 on the wheel 14 gives the true length of the fiber.

This device may also be used to measure crimp in several ways, the simplest of which is as follows:

The three clamps are brought to the initial position and the device set as described above in connection with the measurement of length of fibers, and the fiber to be tested is placed in the jaws as above described. The knob 21 is then turned clockwise for a given displacement of the fiber clamp 3a from the fiber clamp 3b, say, ten centimeters. This displacement should be sufficient to take out all of the crimp of the fiber. The said clamp 3a is then manually brought back toward the fiber clamp 3b until all tension on the fiber is removed, thus leaving it in this natural crimped condition. The distance traversed by the clamp 3a in returning the fiber to its original crimped condition is a measure of the crimp for the initial length of stretched fiber used in the test.

Having fully disclosed my discovery, I claim:

1. A device for measuring the length of fibers which comprises a base, uprights extending from said base, twin wheels having cylindrical outer surfaces mounted to revolve on a common axis and adjacent each other, on said uprights, one of said wheels being an outer wheel, the other an inner wheel having a graduated scale on its circumference surface, shaft and gear means to revolve the twin wheels in unison clockwise and counter-clockwise and the outer wheel independently of the inner wheel clockwise and counter-clockwise, three fiber clamps having upper transparent jaws, mounted closely adjacent the outer circumference surfaces of the twin wheels, one of which clamps is rigidly attached to the outer wheel, and one of which clamps is rigidly attached to the inner wheel at the zero point on the graduated scale, the remaining clamp being independently mounted to rotate relatively to both wheels, stop means to limit the movement of said clamps clockwise and counter-clockwise on the outer circumference surfaces of the twin wheels to which they are not rigidly attached and a single control member to actuate all said shafts, gears, stops, wheels and clamps.

2. A device for measuring the length of fibers which comprises twin wheels having cylindrical outer surface and, mounted to revolve on a common axis and the rims of which are slidably adjacent each other, one of said wheels being an outer wheel, the other an inner wheel having a graduated scale on its circumference surface, means to revolve the twin wheels in unison clockwise and counter-clockwise and the outer wheel independently of the inner wheel clockwise and counter-clockwise, three fiber clamps mounted over the rims of the wheels, one of which clamps is rigidly attached to the outer wheel, one of which is rigidly attached to the inner wheel at the zero point on the graduated scale and the remaining clamp being independently mounted to move about both wheels, and coordinating means controllably to move each clamp and its wheel independently of the other clamp and wheel.

3. In a device for measuring the length of fibers, twin wheels having cylindrical outer surfaces, one of said surfaces having a graduated scale, said wheels being mounted to revolve on a common axis, the rims of which wheels are slidably adjacent each other at the sides thereof, a fiber clamp mounted on the circumference of each respective wheel, and means to rotate each wheel and associated clamp independently of the other wheel and clamp.

JOHN I. HARDY.